Patented Dec. 29, 1931

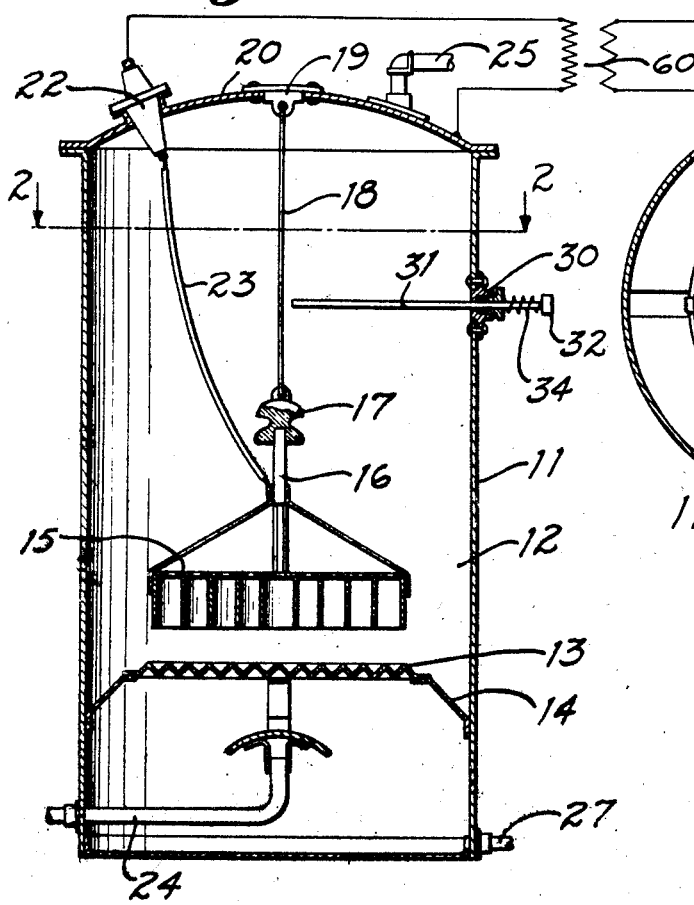
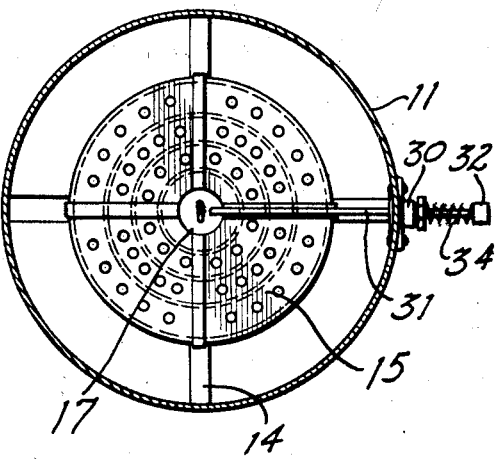
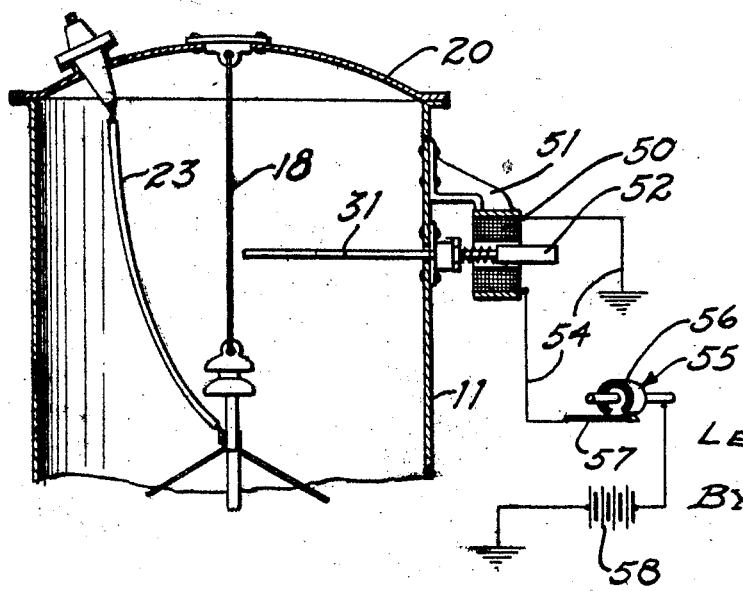

1,838,847

UNITED STATES PATENT OFFICE

LEVERING LAWRASON, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF AND APPARATUS FOR MECHANICALLY REESTABLISHING THE DIELECTRIC FIELD IN DEHYDRATORS

Application filed July 14, 1926, Serial No. 122,386. Renewed October 13, 1931.

This invention relates to electrical dehydration apparatus. Petroleum oil often occurs in nature in the form of an emulsion containing small particles of water which must be removed before the petroleum oil is commercially useful. Electrical dehydration processes are used extensively for this purpose, consisting of subjecting the emulsion of petroleum oil and water to a high potential in an electric field which coalesces the small particles of water into masses which will separate from the petroleum oil by precipitation. Processes of this character are often carried on in an apparatus having a tank in which a grounded electrode in electrical contact with the tank and a live electrode insulated from the tank are placed. An electric field is established between these electrodes and the particles of water are coalesced by the field into masses of water which separate from the oil by gravity. The masses of water under unfavorable conditions may join into short-circuiting chains between the electrodes and provide conductors between the electrodes through which electricity may pass. This results in a flow of current, thus increasing the cost of operation of the dehydrator and greatly reduces its efficiency, sometimes preventing a successful operation thereof.

It is an object of this invention to provide an extremely simple mechanical means for distributing one of the electrodes of a dehydrator for the purpose of breaking the chains or masses of water between the ground and live electrodes.

It is a further object of this invention to provide a method of breaking short circuiting chains of water in a dehydrator which will consume a minimum of power.

Other objects and advantages will be made evident hereinafter.

Referring to the drawings in which I illustrate the invention,

Fig. 1 is a vertical section through a dehydrator embodying the features of my invention.

Fig. 2 is a section taken on the line 2—2 of Fig. 1.

Fig. 3 is a fragmentary view of an alternative form of the invention.

Referring to Figs. 1 and 2 of the drawings the dehydrator has a tank 11 which provides a dehydrating chamber 12. Supported near the lower part of the dehydrating chamber 12 is a grounded or primary electrode 13, the grounded electrode 13 being secured in electrical connection with the tank 11 by suitable straps 14. Supported in the dehydrating chamber 12 above the grounded electrode 13 is a live or secondary electrode 15. The live electrode forms a part of an electrode structure which also includes a supporting means which may conveniently comprise a bar 16 at the upper end of the live electrode and secured to an insulator 17 which is attached to the lower end of a flexible hanger 18 supported from an attachment plate 19 secured to a top 20 of the tank 11. Extending through the top 20 of the tank 11 is an insulator bushing 22 to which is connected a conductor 23 which is extended and connected to the live electrode 15. Emulsion consisting of oil carrying particles of water is introduced into the lower end of the dehydrating chamber 12 by means of an inlet pipe 24. Oil from which the water has been separated is withdrawn from the dehydrating chamber 12 through an oil outlet pipe 25 which is connected to the top 20 of the tank 11. Water which has been separated from the oil is removed from the lower end of the dehydrating chamber 12 through an outlet pipe 27 which is connected to the lower part of the tank 11.

The device of my invention has a stuffing box 30 which is secured to the side of the tank 11. Extending through the stuffing box 30 to the interior of the tank 11 is a plunger 31. At the outer end of the plunger 31 is formed a head 32, by means of which force may be applied to move the plunger 31 inward. Surrounding the plunger 31 between the stuffing box 30 and the head 32 is a coil spring 34 which is provided for the purpose of resiliently retaining the plunger in the position shown in the drawings. The inner end of the plunger 31 is so disposed that when the plunger moves inward it will engage the flexible hanger 18. The shock of this contact will cause the live electrode 15 to vibrate or swing and thus send vibratory waves through the emulsion in the tank. A source of electrical potential such as a transformer 60 is used to impress a potential between the grounded and live electrodes 13 and 15. The emulsion introduced through a pipe 24 will flow upward into the space between the grounded and live electrodes 13 and 15. The emulsion is substantially dielectric and consequently there will be no flow of electricity between the electrodes. As treatment progresses the particles of water are coalesced and the masses thus formed join into short-circuiting chains, thus tending to decrease the dielectric qualities of the emulsion and establish a flow of electricity through the field from one electrode to the other. As pointed out heretofore, this impairs the operation of the dehydrator, making it inefficient in operation and increasing the cost of operation. At intervals the plunger 31 may be moved inward against the action of the spring 34 so as to engage the flexible hanger 18 of the supporting means. This will disturb the live electrode 15 and send vibratory waves through the liquid in the dehydrating chamber to break the short-circuiting chains which have been formed. The plunger 31 is immediately returned to normal position such as is shown in the drawings.

The breaking of the chains of globules is accomplished by a vibration of the electrode 15. This vibration is imparted to the emulsion surrounding the electrode 15 and tends to agitate the liquid so that the fine globules forming the short circuiting chains are displaced relative to each other so that the conductivity of the chains is greatly diminished.

In a previous method for breaking the short circuiting chains of water globules, an entire electrode is bodily reciprocated relative to the other electrode. This causes a pumping action or alternate rush of liquid in an out between the two electrodes. The large amount of power required to operate such an apparatus makes it expensive and greatly decreases its value.

My method, on the other hand, may be accomplished by a mere vibration, at a relatively high rate, of the liquid between the two electrodes. In the present apparatus this is done by vibration of one of the electrodes.

It will be very obvious from the drawings and description that my invention is effective in breaking the short-circuiting chains and is very simple in construction, being very economical to manufacture and install.

In Fig. 3 I show a modified form of the invention. The form of the invention shown in Figs. 1 and 2 is adapted for manual operation. The form of the invention shown in Fig. 3 is provided with a solenoid 50 which may be supported by a suitable bracket 51 which is attached to the tank 11. Instead of providing the head 32 as is done in the first form of the invention, a solenoid core 52 is provided which extends through an opening in the solenoid 50. The solenoid 50 has a circuit 54 which is provided with a circuit breaker 55 which consists of a rotatable contact 56 and a contact finger 57. Any suitable source of energy may be utilized, such as a battery 58. The rotatable contact 56 may be slowly turned by means not shown, so that the circuit 54 is completed at intervals so as to energize the solenoid 50 at intervals. When the solenoid 50 is energized the solenoid core 52 will be drawn into the solenoid 50, thus moving the plunger 31 into engagement with the flexible hanger 18 and thus vibrating the live electrode 15. This form of my invention, as is apparent, is automatic.

I have shown and described a manually operable and an automatic form of my invention. These two forms, although slightly different in construction, embody the same principles and illustrate that the invention may be embodied in slightly different forms of devices without deviating from the spirit and scope thereof.

I claim as my invention:

1. In an electrical dehydrator, the combination of: a tank adapted to hold a liquid to be dehydrated; electrodes disposed in said liquid in spaced relation to each other; means for setting up an electric potential between said electrodes, tending to form chains of conducting globules between said electrodes; and means for breaking said chains by causing vibratory waves to pass through said liquid.

2. In an electrical dehydrator, the combination of: a tank adapted to hold a liquid to be dehydrated; electrodes disposed in said liquid in spaced relation to each other; means for setting up an electric potential between said electrodes, tending to form chains of conducting globules between said electrodes; and means for breaking said chains by causing vibratory waves to pass through one of said electrodes.

3. In an electrical dehydrator, the combination of: a tank adapted to hold a liquid to be dehydrated; a grounded electrode and a live electrode disposed in said liquid in spaced relation to each other; means for setting up an electric potential between said electrodes, tending to form chains of conducting globules between said electrodes; and means for breaking said chains by causing vibratory waves to pass through said live electrode.

4. In an electrical dehydrator, the combination of: a tank; a substantially horizontal grounded electrode mounted in said tank; a substantially horizontal live electrode assembly mounted in said tank, said live electrode being superimposed above said grounded electrode; and means for vibrating said live electrode in a direction substantially parallel with said grounded electrode in order to destroy short circuiting chains which form between said electrodes.

5. In an electrical dehydrator, the combination of: a grounded electrode; a live electrode assembly and including a live electrode, said electrodes having a superimposed relation, one with the other; and means for periodically vibrating one of said electrodes in a direction substantially parallel with the other of said electrodes in order to destroy short circuiting chains which form between said electrodes.

6. A method of breaking short circuiting chains in a dehydrator, said method comprising: forming short circuiting chains in a body of emulsion by the passage of an electric current through said emulsion; and periodically breaking said chains by causing vibratory waves to pass through said liquid.

7. A method of treating an emulsion by the use of a pair of spaced electrodes, which method includes the steps of: setting up an electric field between said electrodes; passing said emulsion through said electric field; and rapidly vibrating one of said electrodes during the time that said emulsion is subjected to the action of said electric field.

8. In an electrical dehydrator, the combination of: a primary electrode; an electrode structure including a secondary electrode spaced from said primary electrode to define a treating space; means for establishing an electric field in said treating space; means for delivering the fluid to be treated to said treating space, said fluid having a tendency to short-circuit said electrodes; and means for setting said secondary electrode into rapid vibration, said means mechanically contacting said electrode structure.

9. In an electrical dehydrator, the combination of: a primary electrode; an electrode structure including a supporting means and a secondary electrode supported thereby, said secondary electrode being spaced from said primary electrode to define a treating space; means for establishing an electric field in said treating space; means for delivering the fluid to be treated to said treating space, said fluid having a tendency to short-circuit said electrodes; and means cooperating with said supporting means for setting said secondary electrode into rapid vibration.

10. A combination as defined in claim 9 in which said supporting means is flexible and in which said secondary electrode is suspended therefrom, and in which said last-named means is movable toward and away from said supporting means to flex said supporting means.

11. In an electrical dehydrator, the combination of: a tank; a primary electrode disposed in said tank; an electrode structure including a secondary electrode spaced from said primary electrode to define a treating space; means for establishing an electric field in said treating space; means for delivering the fluid to be treated to said treating space, said fluid having a tendency to short-circuit said electrodes; and means extending through the walls of said tank for setting said secondary electrode into rapid vibration.

12. A combination as defined in claim 11 in which said last-named means comprises a plunger adapted to mechanically contact said electrode structure.

13. In an electrical dehydrator, the combination of: a tank containing a liquid; electrode means in said tank for establishing an electric field containing the emulsion to be treated, said electric field being in open communication with the interior of said tank whereby the treated emulsion may gravitationally separate in said tank; means for vibrating the liquid in said tank to cause vibratory waves to pass through the liquid in said tank and through the emulsion undergoing treatment in said field; and means for withdrawing the separated constituents of said emulsion from opposite ends of said tank.

14. In an electrical dehydrator, the combination of: a tank containing a liquid; electrode means in said tank for establishing an electric field containing the emulsion to be treated; supply means for supplying said emulsion to said liquid in said tank at a section spaced from said electric field, said emulsion thereafter flowing into said electric field and subsequently being again discharged into said liquid in said tank whereby it may gravitationally separate therein; means for vibrating the liquid in said tank to cause vibratory waves to pass through the liquid in said tank and through the emulsion undergoing treatment in said field; and means for withdrawing the separated constituents of said emulsion from opposite ends of said tank.

15. A method of separating the phases of an emulsion, which includes the steps of: subjecting said emulsion to the action of a high intensity electric field; and passing vibratory waves through said emulsion while it is being acted upon by said electric field to prevent excessive current flow through said field.

16. A method of treating a petroleum emulsion, which includes the steps of: establishing an electric field of high intensity; introducing said emulsion into a space communicating with said electric field; and passing vibratory waves through said liquid in said space.

17. In an electrical dehydrator, the combination of: a pair of electrodes defining a treating space between which an electric field is set up; walls defining a space communicating with said treating space; emulsion inlet means opening on said space and supplying emulsion thereto, said emulsion thereafter flowing into said electric field; and means for passing vibratory waves through said emulsion in said space.

18. An electrical dehydrator comprising: a treating tank; opposed electrodes providing an intermediate electric field for effecting dehydration of an emulsion; and means for producing a mechanical shock in one of said electrodes to prevent the formation of short-circuiting chains of water globules.

19. A method of dehydrating emulsions which comprises: passing the emulsion through an electric field between opposed electrodes; and subjecting one of said electrodes to mechanical shock at intervals to prevent a formation of short-circuiting chains of water globules.

In testimony whereof, I have hereunto set my hand at Los Angeles, California, this 8th day of July, 1926.

LEVERING LAWRASON.